Nov. 1, 1932.  A. A. G. LAND  1,885,361
CHAIN LINK WIRE FABRIC
Filed Feb. 17, 1930    4 Sheets-Sheet 1
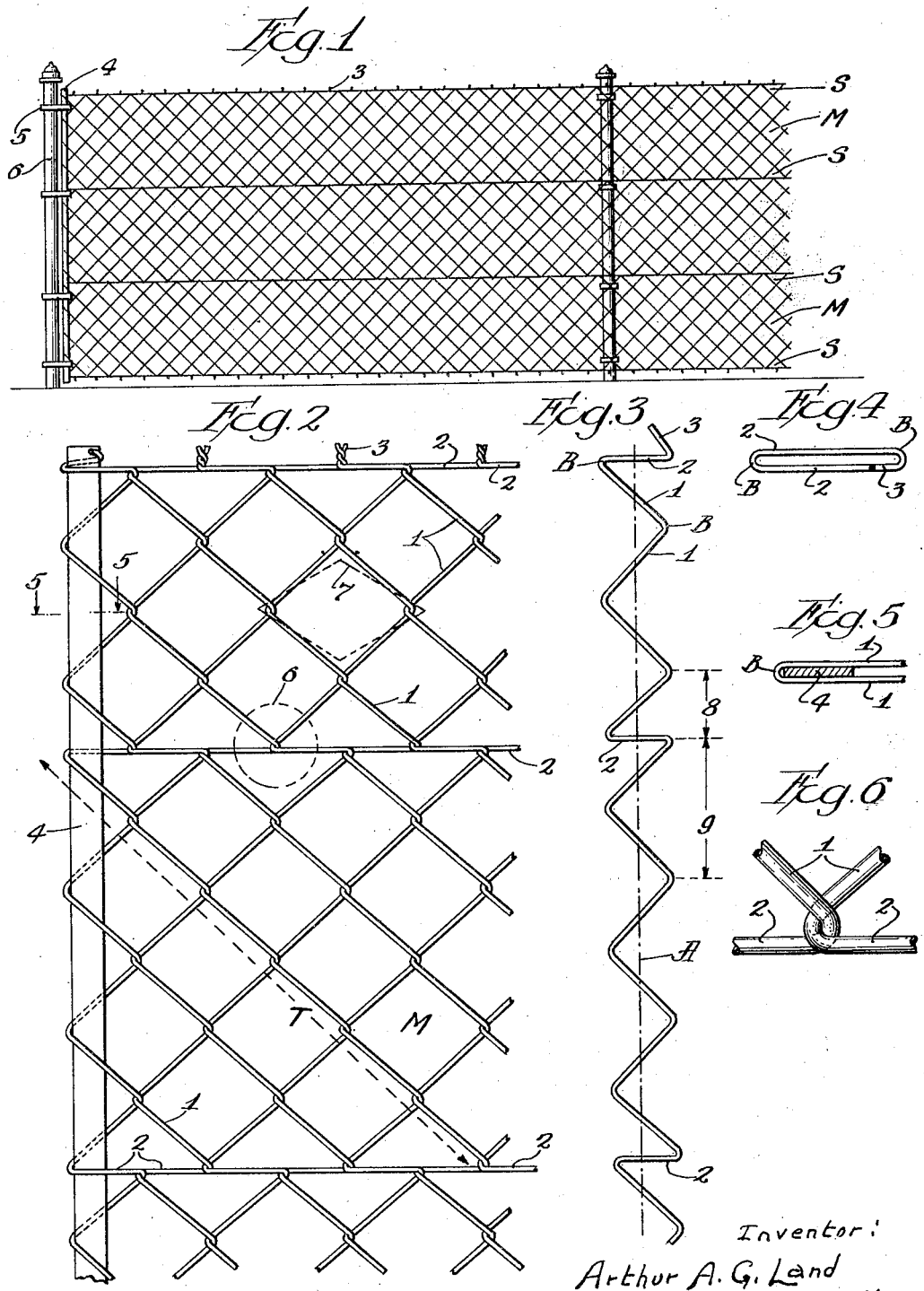
Inventor:
Arthur A. G. Land
by Albert Scheible Nov. 1, 1932. A. A. G. LAND 1,885,361
CHAIN LINK WIRE FABRIC
Filed Feb. 17, 1930 4 Sheets-Sheet 2
Fig.7
Fig.12
Fig.8
Fig.9
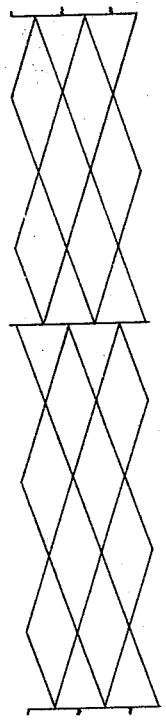
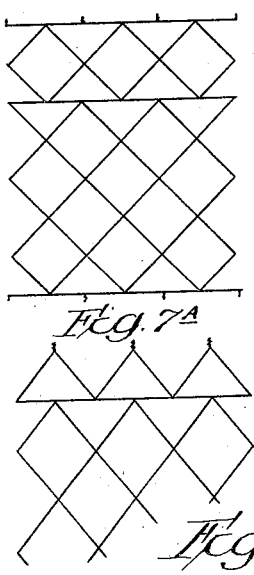
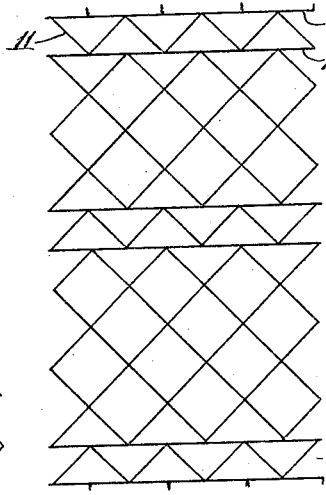
Fig.7A
Fig.10
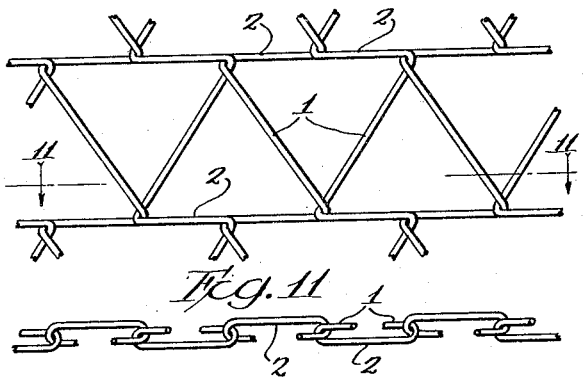
Fig.13
Fig.11
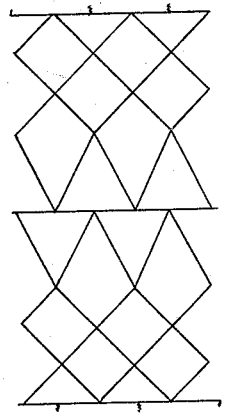
Fig.7B
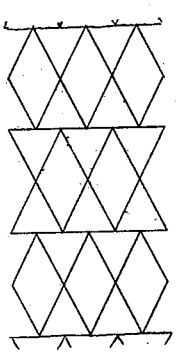
Inventor:
Arthur A. G. Land
by Albert Scheib
Attorney Nov. 1, 1932.  A. A. G. LAND  1,885,361

CHAIN LINK WIRE FABRIC

Filed Feb. 17, 1930  4 Sheets-Sheet 3

Inventor:
Arthur A. G. Land
by Albert Scheible
  Attorney

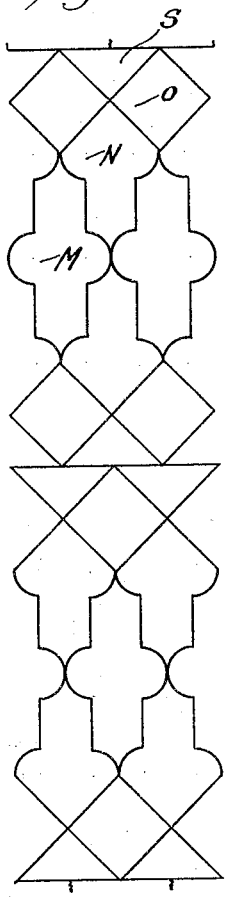
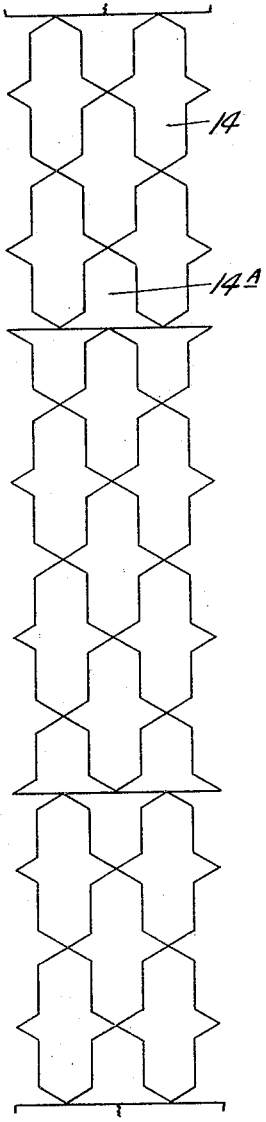
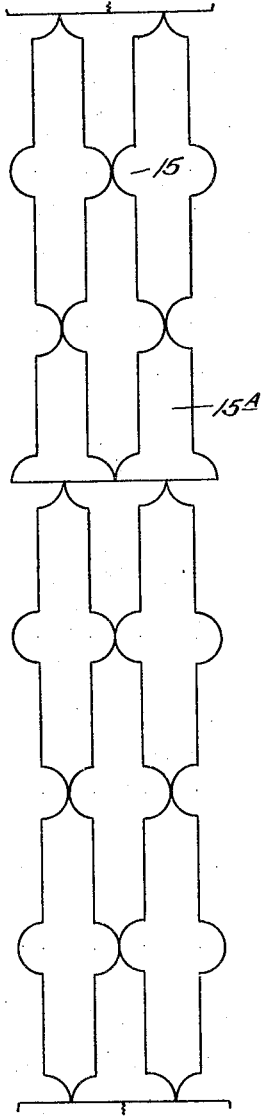
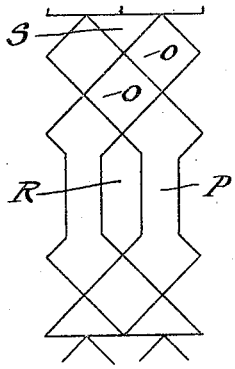

Patented Nov. 1, 1932

1,885,361

UNITED STATES PATENT OFFICE

ARTHUR A. G. LAND, OF CHICAGO, ILLINOIS

CHAIN-LINK WIRE FABRIC

Application filed February 17, 1930. Serial No. 428,889.

My invention relates to chain-link wire fabrics, namely fabrics composed of zigzag strands extending transversely of the fabric, with each strand presenting bights at each edge of the zigzag strand, and with each two consecutive strands intertwined to interlock bights of these strands.

Fabrics of this construction can readily be manufactured with quite simple machines and at low cost in any desired width of the fabric; and also have the advantage over other fabric constructions that each strand is effectively hinged to each of the strands between which it is disposed, so that the fabric can readily be rolled up even when made of stiff wire.

However, the chain-link fabrics as heretofore in use cannot be longitudinally tensioned to any considerable degree—as when stretching such fabrics between widely spaced fence posts—without distorting the shape of the meshes and contracting the fabric in width. Consequently, such fabrics have only been extensively used when it was permissible also to provide stiff rails or auxiliary wires extending longitudinally of the fabric at both edges of the fabric, to which the fabric can be attached so as to be entirely framed by auxiliary stiffening members.

My present invention aims to provide a chain-link wire fabric composed of strands having zigzag formations so formed as to afford interlinked portions extending longitudinally of the fabric in common planes, which portions cooperate like the links of an ordinary chain to take the strain of the longitudinal tensioning; thereby eliminating the need of any auxiliary bars or frame members, and permitting the fabric to be adequately tensioned even when made of relatively light wire. Moreover, my invention aims to provide a chain-link wire fabric in which the number of these chain-link portions can readily be varied without increasing the manufacturing difficulties, so as to afford varying degrees of rigidity in the fabric.

Furthermore, my invention aims to provide easily manufactured and readily intertwined constituent strands for chain-link wire fabrics, in which novel but simple secondary formations impart such an enhanced longitudinal rigidity to fabrics which have portions composed of ordinary forms of meshes; and aims to provide strand constructions which will readily permit the number and location of the rigidity-enhancing mesh sides to be varied according to the size and shape of the said main meshes, and according to the diameter and rigidity of the wire employed for the strands.

So also, my invention aims to provide a rigidity-enhancing strand and fabric construction for chain-link wire fabrics, which can be employed with equal facility and effectiveness in connection with main fabric meshes of widely varying shapes; and which will enhance, rather than detract from, the appearance of the fabrics.

Still further and also more detailed objects will appear from the following specification and from the accompanying drawings, in which drawings Fig. 1 is an elevation of a portion of a wire fence, including a chain-link wire fabric embodying my invention; which fabric has tension-enhancing meshes both at its upper and lower edges and along two intermediate portions.

Fig. 2 is an enlarged elevation of a portion of a fabric similar to that of Fig. 1, but having more closely spaced rows of the tension-enhancing meshes and rigidity-affording strand legs.

Fig. 3 is an elevation of one of the counterpart strand parts of which the fabric portion of Fig. 2 is composed.

Fig. 4 is an enlarged plan view of the strand of Fig. 3.

Fig. 5 is an enlarged horizontal section taken along the line 5—5 of Fig. 2.

Fig. 6 is an enlargement of the dotted portion 6 of Fig. 2.

Fig. 7 is a diagrammatic elevation of a portion of another tension-enhanced fabric embodying my invention, namely one in which the main meshes are tall in proportion to their horizontal spread.

Fig. 7 A is a diagrammatic elevation of a fabric portion in which chain-effect legs are adjacent to, but spaced from a longitudinal edge of the fabric.

Fig. 7 B is a diagrammatic and fragmentary elevation of a portion of a fabric in which the major meshes are all diamond-shaped and in which the fabric presents chain-effect legs extending along the top and bottom corners of each longitudinal row of these diamond-shaped meshes.

Fig. 8 is a diagrammatic elevation of a portion of a fabric presenting double rows of chain-effect strand legs.

Fig. 9 is an enlarged elevation of one of the strands of which the fabric of Fig. 8 is composed.

Fig. 10 is an enlarged elevation of one of the portions of the fabric of Fig. 8 which present the double rows of chain-effect strand legs.

Fig. 11 is a plan view of the fabric portion shown in Fig. 10.

Fig. 12 is a diagrammatic elevation of a portion of a fabric presenting partly diamond-shaped and partly triangular meshes between two rows of the chain-effect strand legs.

Fig. 13 is a diagrammatic elevation of a fabric portion including three rows of chain-effect strand legs, showing variations in the shape of the meshes in the fabric.

Figure 14:
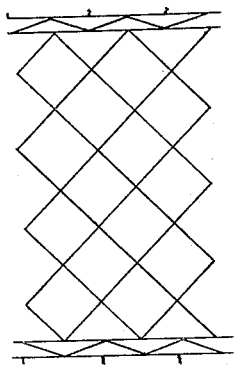

Fig. 14 is a fragmentary and diagrammatic elevation of a portion of a chain-link wire fabric provided at its upper end and also at its lower edge with rows of chain-effect strand legs more closely spaced than those of Fig. 8.

Figure 15:
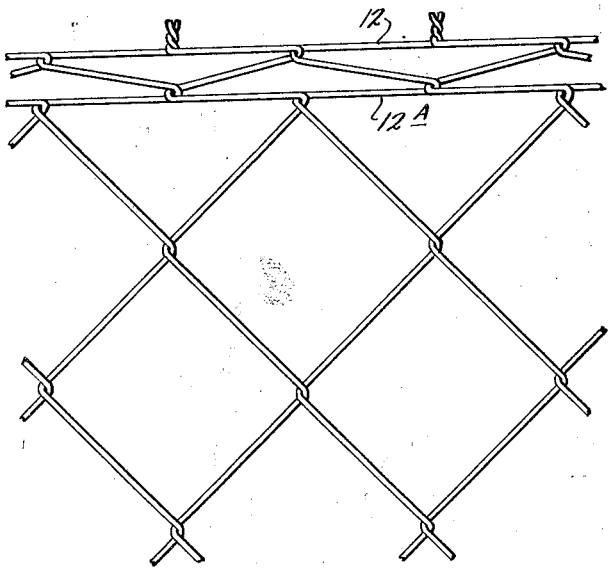

Fig. 15 is an enlarged elevation of an upper portion of the fabric of Fig. 14.

Figure 16:
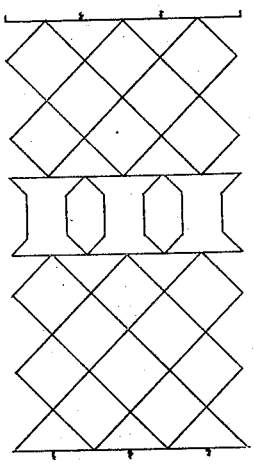

Fig. 16 is a diagrammatic elevation of a portion of a fabric embodying my novel chain-effect strand legs and presenting a medial double row of such legs in association with meshes of different shape from the other meshes of the fabric.

Figure 17:
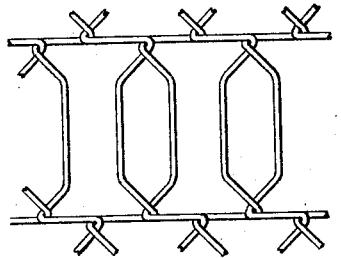

Fig. 17 is an enlarged elevation of a vertically medial part of the fabric of Fig. 16.

Figs. 18 to 22 inclusive are diagrammatic views showing the use of my chain-effect strand legs and rigidity-increasing secondary meshes in fabrics presenting meshes of various ornamental configurations.

Since such tension-enhanced fabrics are particularly suitable for use as fences, I am here describing my invention in that connection, and in Fig. 1 am showing an upright fabric of my invention, supported by fence posts. The meshes of this fabric are mainly of the usual so-called diamond-mesh shape, namely meshes M shaped like a square having its legs at equal angles to a longitudinal edge of the fabric; while certain horizontal rows of meshes S are of triangular shape, with the triangle-base forming legs of the meshes in each such row extending in a common horizontal plane, so that these interlinked base legs afford chain effect to increase the rigidity of the fabric.

To provide such a mesh arrangement in a fabric composed entirely of consecutively intertwined strands extending transversely of the fabric, I employ counterpart zigzag strands, such as that shown in Fig. 3 as a constituent strand of the fabric portion of Fig. 2. Each such strand is a flattened spiral (shown in enlarged plan view in Fig. 4) which is of zigzag elevation (as shown in Fig. 3). Viewed in elevation, the strand presents its consecutive bights B alternately at opposite lateral edges of the strand, and the bights at each edge of the strand aline on lines parallel to the longitudinal medial axis A of the zigzag strand, each bight being constituted by what is approximately a 180-degree bend in a plan view of the strand.

To obtain both the ordinary diamond-shaped main meshes M and the secondary tensioning meshes S in the resulting fabric after the manner illustrated in Figs. 1 and 2, I provide the strand with zigzag formations presenting consecutive oblique strand legs 1 which cross the strand axis A at equal acute angles. Then I also provide strand legs 2, each of which extends at right angles to the strand axis A with at least one of these legs 2 disposed between two strand sections in which the consecutive legs extend oblique to the said axis. Thus constructed, each strand is made up of sections in which all of the legs 1 are at oblique angles to the strand axis A; while each leg 2 which is common to consecutive sections, crosses the axis of the strand at right angles to this axis and parallel to the longitudinal edge line of the fabric. When these strands are assembled, each two strands form meshes S and M which are of equal width longitudinally of the fabric but of different spreads transversely of the fabric. In the assembled fabric the shorter meshes S are disposed between taller meshes M, and the meshes S and M arranged respectively in sections extending longitudinally of the fabric; and the wire portions 2, which are common to the consecutive sections, extending parallel to the edge line of the fabric. The wire portions 1 of the main meshes M extend at acute angles to the edge line of the fabric and they also extend at acute angles to the basal mesh sides 2 of the secondary tensioning meshes S.

When such counterpart strands are consecutively spirally intertwined through one another to interlink the bights at one edge of each strand with the bights at the adjacent edge of the next strand, the interwined strands present so-called diamond meshes M (each having four of the legs 1 as its inclined sides); and also present triangular stiffening meshes S, each having a horizontal base formed by two interlinked strand legs 2, and two inclined triangle sides each constituted by a strand leg 1.

In practice, the strands are desirably formed so as to dispose one of the horizontal strand legs 2 near each end of the strand, with only a short inclined strand end portion 3 projecting beyond each such endward leg 2, and these end portions of each two consecutive strands are then intertwisted as shown at the top of Fig. 2.

In erecting such a fabric for a fence, it is customary to slide a vertical bar 4 through the vertically alined bights at each end of the fabric. One of these bars is then lashed, as by clamps 5 to a fence post 6, and a bar 4 at the other end of the fabric is fastened to a companion fence post after pulling the fabric taut horizontally.

If the fabric were composed entirely of the diamond meshes M, a separational movement of two such bars 4 would elongate each such mesh horizontally and contract it in height, as shown in dotted lines at 7 in Fig. 2. Consequently, the fabric could only be stretched taut if made of much heavier and stiffer wire than would otherwise be needed for a fence, unless the upper and lower edges of the fabric were first connected also to auxiliary rails or stiffening wires extending between the fence posts.

However, with my fabric each horizontal row of the auxiliary meshes S presents the interlinked base legs 2 of these meshes in the form of a horizontally disposed chain, corresponding in plan view to Fig. 11. Consequently, these chain-forming strand legs positively limit the longitudinal stretching of the fabric, since an elongation such as that shown in dotted lines at 7 in Fig. 2 could only be obtained by a corresponding longitudinal stretching of two consecutive mesh legs 2, and such a longitudinal stretching of the chain-forming mesh legs would require a many times greater force than that required for merely changing the angle between two consecutive main mesh sides 1.

For this reason, a longitudinal stretching of the fabric to the slight extent required for tensioning each of the chains formed by a series of horizontally consecutive strand legs will not materially change the shape of any of the meshes of the fabric. However, even this tensioning of the chain-forming fabric portions will also effect a tensioning of the inclined mesh legs which approximately aline with each other, as for example the series of legs T in Fig. 2, so that every mesh in the fabric will also be drawn taut when the chain-forming legs in the fabric are tensioned. Consequently, I readily secure a much greater tautness and rigidity than has heretofore been obtainable with chain-link wire fabrics of the same size of mesh when formed of the same size and rigidity of wire. This great difference in tautness and rigidity permits me to employ much lighter wire for such fabrics, thereby effecting a correspondingly large saving in the cost of the fabric.

For many purposes, and particularly for fabrics of relatively small fabric widths (or relatively small heights when used in upright positions), the chain-forming strand legs 2 only need to be provided at or adjacent to each edge of the fabric. However, additional intermediate chain-forming legs 2 may also be employed, as shown for example in Fig. 1) for fabrics of greater width in proportion to their length, or to secure the desired rigidity with a lighter wire than would be required when the chain-forming legs are disposed only at each longitudinal edge of the fabric. Moreover, the relative proportion between the height 8 of the triangular-mesh forming zig-zag strand portions (Fig. 3) and the main-mesh forming portions 9 is immaterial, so that the shape selected for either of the two types of meshes may be greatly varied. For example, both the main (diamond shaped) meshes and the secondary (triangular) meshes may be of greater height in proportion to their width than those of Figs. 1 and 2, as shown in Figs. 7 and 7 B.

So also, the advantages secured by these chain-forming fabric portions can be increased still further by forming the strands so as to present pairs of such chain-forming strand legs in closely spaced portions of the strand instead of single and widely spaced strand legs of this disposition. For example, Fig. 8 diagrammatically shows a portion of a fabric, formed from strands (Fig. 9), each of which strands presents pairs of horizontal legs 10, with the legs 10 of each pair connected by a single triangle-side-forming inclined strand leg 11, thereby substantially doubling the chain effects in the fabric over that in a fabric of the type of Fig. 2.

Where a still higher rigidity is desired for a fabric of given size, made of the same wire and with the same size of its main meshes, this can be secured by more closely spacing the two chain-forming strand legs of each pair of such adjacent legs, such as the legs 12 and 12 A in Fig. 15, which figure is an enlargement of a part of Fig. 14.

Furthermore, the shapes and relative proportions of both the main meshes and the secondary or tensioning meshes of my novel fabric can be varied greatly without materially affecting its above recited advantages. For example, Fig. 16 diagrammatically shows an embodiment of my invention in which a part of the secondary meshes are of the six-bight type more fully disclosed in my co-pending application No. 461,276, filed June 16, 1930, on a chain-link wire fabric. Fig. 17 shows an enlarged elevation of a part of such a fabric portion.

Figs. 18 to 22 inclusive show embodiments of my invention in fabrics presenting other types of ornamental meshes, thus illustrating how greatly the appearance of such fabrics can be altered. Each of these figures also shows an essential characteristic which is found likewise in the heretofore described types, namely the securing of the enhanced strength and rigidity in a fabric having a given shape of main meshes, by also including secondary meshes of less height than the main meshes; which secondary meshes are shortened or truncated forms of the main meshes and present legs extending longitudinally of the fabric, or at right angles to the medial longitudinal axes of the strands of which the fabric is composed.

Figure 18:
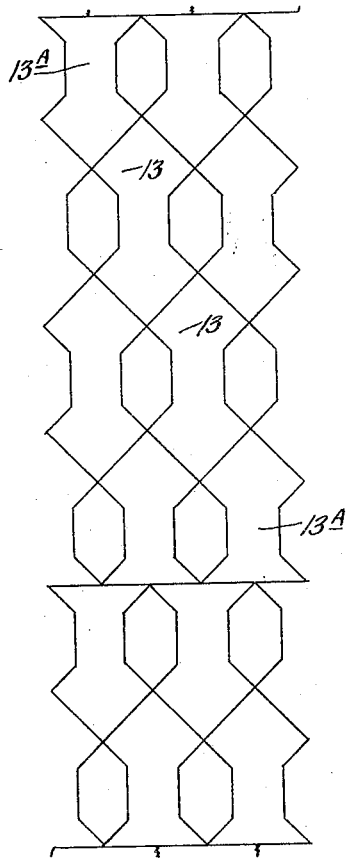

For example, in Fig. 18, the secondary meshes 13 A are shortened or truncated modifications of the main meshes 13, and the same relation holds true of the secondary or tension-enhancing meshes 14 A and 15 A of Figs. 19 and 20 with respect to the main meshes (14 and 15 respectively) of these figures. In the fabrics of Figs. 2, 7, 8, 19 and 20, each such secondary mesh corresponds in shape and size to half of a main mesh and presents either its upper or its lower mesh side longitudinally of the fabric, and in Fig. 18 each secondary mesh corresponds to somewhat more than half a main mesh.

However, such a patterning of the secondary meshes after portions of main meshes is not imperative, since the advantages of my fabric construction can also be secured when the secondary or tensioning meshes are decidedly different in appearance from the main meshes, provided that they present mesh sides extending longitudinally of the fabric. For example, Fig. 21 shows the use of triangular tensioning meshes S in fabrics in which the general appearance depends largely on the providing of much larger main meshes M of curved and ornamental configuration, in conjunction with main meshes N and O of other shapes. Fig. 22 shows the use of tensioning meshes S in connection with six-bight main meshes P, and two-bight main meshes R, and four-bight main meshes O.

Since the constituent flattened spiral strands for any of the here illustrated fabrics can be manufactured cheaply with simple machinery, and can easily be consecutively interwisted, my invention does not involve any increase in the manufacturing cost over that of the ordinary diamond-mesh chain-link wire fabrics. On the other hand, it permits the use of considerably lighter wire for securing any predetermined rigidity in a fabric presenting a given general type of main meshes, thereby considerably reducing the cost. Furthermore, my fabrics afford a larger factor of safety against an excessive tensioning during their erection than is obtainable with the ordinary chain-link wire fabrics in which all strand legs extend at acute angles across the strand axes.

However, while presenting these advantages over the chain-link fabrics heretofore employed, by fabrics retain the advantages of this general class of fabrics over wire fabrics in which the constituent strands extend longitudinally of the fabric. Fabrics of the latter type cannot be rolled up for compact storage or shipment when made of stiff wire; whereas the interlocking of the bights of every two consecutive strands in my fabric affords a hinging connection between these strands, so that my fabric (in spite of enhanced strength) can readily be rolled up and unrolled again even when made of a cheap and stiff grade of wire.

Moreover, by untwisting the ends of any strand of my fabric, and then spirally rotating this strand, this strand can readily be removed, thereby severing any desired length of the fabric from the roll and leaving smooth fabric edges; whereas fabrics in which the strands extend longitudinally of the fabric cannot be severed without using cutting tools and leaving jagged ends. So also, fabrics composed of longitudinally extending strands cannot be connected to each other without difficulty made and unsightly joints, whereas the mere intertwisting of a strand between the end strands of two pieces of my fabric will make an invisible joint between these pieces.

Since the rigidity of my fabric will obviously be greatest along the chain-like tensioning legs of the secondary meshes, its rigidity can be varied (with a given size and shape of main meshes and a given size of wire) by merely varying the number of such chain-like tensioning portions in the fabric. So also, with a given spacing between the rows of chain-effect base legs in the secondary meshes, the resiliency of the intervening portions of the fabric can be varied by changing the size of the main meshes.

Hence my fabric will readily afford the needed longitudinal resistance to tensioning, along with a desirable resiliency to withstand impacts at right angles to the general plane of the fabric, even when the main meshes are quite tall in proportion to their widths; so that I can obtain the same ball-excluding effect (as in a fence around a tennis court) with meshed fabrics of the type of Fig. 7 as that obtained heretofore with fence fabrics composed mainly of diamond meshes similar to those of Fig. 7, but stiffened by rigid upper and lower rails, and at a large reduction in cost.

Furthermore, since my secondary tensioning meshes can readily be used conjointly with main meshes in which mesh sides are formed to reduce the maximum size of objects excluded by the meshes as shown for example by Figs. 19 and 20 and as more fully disclosed in my Patent No. 1,816,381, dated July 28, 1931, on a wire fence or grille fabric, the conjoint use of my present invention with that of the said patent permits me to secure any desired rigidity and resiliency in wire-saving fabrics of high object-excluding effect and of highly ornamental appearances.

It will also be obvious from the drawings that I can provide the severely tensionable chain-effect portions in fabrics having widely different shapes of meshes, as shown for example by a comparison of Figs. 7, 18 and 21; also that with meshes of given general shapes, the relative heights and widths of the meshes may be varied. So also, the number of longitudinal lines along which the tensioning is effected, and the relative spacing between these lines may be varied—as shown for example by comparing Figs. 12, 8 and 14. Likewise, some of the tension-affording strand portions may form meshes of considerably different appearance than other meshes of the fabric, as illustrated in Fig. 16. Moreover, the manner in which the free ends of the adjacent strands are secured to each other at the longitudinal edges of the fabric is immaterial as far as my present invention is concerned, since this invention in its major aspects aims to provide means which will permit a longitudinal tensioning of the fabric also along one or more lines spaced from the lateral edges of the fabric.

I am aware that some heretofore proposed wire fabrics have been formed so as to present highly tension-resisting longitudinal edges while having the entire remaining portion of the fabric highly resilient and incapable of any considerable tensioning. I am also aware that wire fabrics have heretofore been manufactured by consecutively intertwining zigzag wire strands; but these strands invariably have all of the zigzag formations in each strand counterparts of each other, and have had the consecutive spacings between bights at the same edge of any single strand equal, it having been commonly assumed that zigzag strands could only be intertwined when they have the just recited characteristics which cause each two intertwined strands to border meshes of uniform resistance to tensioning.

However, I have discovered that zigzag strands can also be consecutively intertwined into a fabric when the zigzag formations in each strand are not all counterparts of one another, when the consecutive spacings of the bights at one edge of a single strand are not all equal, and when the alternate legs of the strand are not all parallel to one another. By employing this discovery, I am able to use consecutively intertwined strands as the entire constituents of wire fabrics in which the resistance to a tensioning of the fabric (in a direction at right angles to the axes of the strands) can be greatly varied in different fabric portions spaced transversely of the fabric, whereby the fabrics will present either longitudinal "tensioning lines" (each composed of single legs of consecutive strands) or longitudinal rows of highly tension-resisting meshes; whereby the remaining meshes can be formed so that strains on them will be partly transmitted to these tensioning lines or rows of higher-tension-resisting meshes; and whereby the appearance of such wire fabrics can be greatly varied and improved.

However, while I have illustrated my novel strands (as in Figs. 4 and 11) in a form in which each bight extends in plan view through an arc of 180 degrees, and in which the successive strand legs extend in spaced vertical planes, I do not wish to be limited to this or other details of the construction and arrangement above disclosed. Changes might obviously be made without departing either from the spirit of my invention or from the appended claims, and I also do not wish to be limited as to the uses of my here presented fabric.

For example, while the rigidity-enhancing portions of my fabric desirably include chain-affording mesh sides adjacent to each longitudinal edge of the fabric, such portions need not necessarily extend along the extreme edge. Thus, Fig. 7 A shows the sides of a row of secondary meshes as extending beyond the upper chain-effect links, so as to present an upper saw-toothed edge for the fabric, which is often desirable in fences around lawns.

Furthermore, it is to be understood that the terms "interlinked" or "intertwined" are used in the claims as meaning a mere interlooping of the bights of adjacent strands so that a bight of one strand extends only part way around the other strand (which permits the strands to be spirally intertwined), as distinguished from twisting a strand portion one or more whole turns around another strand portion after the manner employed in wire fabrics in which the constituent strands extend longitudinally of the fabric.

I claim as my invention:—

1. A wire fabric comprising flattened and consecutively intertwined zigzag strands extending transversely of the fabric, the zigzag formation of the strands being such that the intertwined strands form rows of meshes extending longitudinally of the strand; the meshes of each row in a portion of the fabric being composed entirely of meshes having at least four mesh-side portions oblique to a longitudinal edge of the fabric; the fabric also including at a distance from both longitudinal edges of the fabric at least one longitudinal row of meshes each of which meshes has a mesh side extending longitudinally of the fabric.

2. A wire fabric comprising consecutively intertwined flattened zigzag wires extending transversely of the fabric, and presenting secondary meshes disposed in rows extending longitudinally of the fabric, the secondary meshes of each row having basal mesh sides extending substantially in alinement with each other longitudinally of the fabric; and main meshes interposed between rows of secondary meshes, the main meshes having the general direction of sides thereof oblique to the basal mesh sides of the secondary meshes; at least one row of the secondary meshes being spaced transversely of the fabric from both longitudinal edges of the fabric.

3. A wire fabric comprising zigzagged strands extending transversely of the fabric and each presenting bights at each edge of the strands, each two consecutive strands being twisted through one another to interlock the bights at the adjacent edges of these strands; the formation of the strands being such as to form rows of main meshes extending longitudinally of the fabric, each such mesh having the general direction of four of its sides disposed at an acute angle to a longitudinal edge of the fabric, and rows of secondary meshes in which the base sides of the meshes extend substantially in alinement with each other and parallel to the said fabric edge, at least one such row of secondary meshes being spaced transversely of the fabric from both longitudinal edges of the fabric.

4. A constituent strand for a chain-link wire fabric comprising a wire formed into a zigzag formation in elevation when the axis of the strand is upright, the strand presenting bights at each lateral edge of the strand and legs diverging from each such bight; the strand including consecutive legs each having a portion thereof extending oblique to the said axis, also including at least one leg interposed between obliquely extending legs and extending at right angles to the said axis.

5. A constituent strand for a chain-link wire fabric comprising a zigzag wire presenting bights at each lateral edge when the axis of the strand is upright and presenting legs diverging from each such bight; the zigzag formation being such that the strand includes two longitudinal sections in which all of the legs diverging from the bights in each such section are oblique to the general axis of the zigzag strand, and an interposed strand portion which has at least one leg extending at right angles to the said axis.

6. A constituent strand for a chain-link type of wire fabric comprising a wire formed to a zigzag formation to present bights at opposite lateral edges of the strand, each two consecutive bights of the strand connected by a leg; the major portion of the strand consisting of consecutive legs each having a part thereof extending in a direction oblique to the axis of the strand; the strand also including a plurality of legs extending at right angles to the axis of the strand, at least one of which legs is interposed between two obliquely extending legs.

7. A constituent strand for a chain-link wire fabric, comprising a wire bent to a zigzag formation to present bights alternately at opposite lateral edges of the strand, each two consecutive bights of the strand being connected by a leg extending across the longitudinal axis of the strand, the major portion of the strand being composed of consecutive legs extending oblique to the said axis; the strand also including a leg extending at right angles to the said axis and respectively adjacent to one end of the strand, and at least one leg interposed between obliquely extending legs and extending at right angles to the said axis and spaced from both ends of the strand.

8. A wire fabric comprising zigzag strands consecutively intertwined so that each two consecutive strands border a row of meshes, each strand presenting a row of bights at each longitudinal edge of the strand and having all bight-connecting strand legs extending across the general axis of the strand; the majority of such legs extending oblique to the said axis, so that the parts of two consecutive strands in which all legs extend oblique to the said axis form four-sided meshes having all mesh-sides oblique to the said axis; each strand also including legs each extending at right angles to the said axis and disposed between two obliquely extending legs, whereby the parts of two consecutive strands consisting of such a right-angled extending leg and the adjacent oblique legs form triangular meshes having their basal sides extending at right angles to the said axis.

Signed at Chicago, Illinois, February 15th, 1930.

ARTHUR A. G. LAND.